Feb. 19, 1935. T. M. BUTLER 1,992,142
CALCULATING MACHINE
Filed Oct. 3, 1932 6 Sheets-Sheet 1

INVENTOR
Thomas M. Butler
BY
Rector, Hibben, Davis, & Macauley
ATTORNEYS

Feb. 19, 1935. T. M. BUTLER 1,992,142
CALCULATING MACHINE
Filed Oct. 3, 1932      6 Sheets-Sheet 3

INVENTOR
Thomas M. Butler
BY
Rector, Hibben, Davis, & Macauley
ATTORNEYS

INVENTOR
Thomas M. Butler
BY
ATTORNEYS

Feb. 19, 1935.  T. M. BUTLER  1,992,142
CALCULATING MACHINE
Filed Oct. 3, 1932   6 Sheets-Sheet 5

INVENTOR
Thomas M. Butler
BY
Rector, Hibben, Davis, & Macauley
ATTORNEYS

Feb. 19, 1935.  T. M. BUTLER  1,992,142
CALCULATING MACHINE
Filed Oct. 3, 1932   6 Sheets-Sheet 6

INVENTOR
Thomas M. Butler
BY
ATTORNEYS

Patented Feb. 19, 1935

1,992,142

UNITED STATES PATENT OFFICE 1,992,142

CALCULATING MACHINE

Thomas M. Butler, Detroit, Mich., assignor to Burroughs Adding Machine Company, Detroit, Mich., a corporation of Michigan Application October 3, 1932, Serial No. 635,902

24 Claims. (Cl. 235—60)

This invention relates to a calculating machine and it is particularly concerned with a novel construction that will enable true negative totals to be taken on such a machine.

In the taking of negative totals it is desirable that these totals be taken with the least possible trouble to the operator and with the waste of as little time as possible. On the other hand, it is desirable, in many lines of business, to have the operator notified when a negative total has occurred. The present invention is directed to a machine in which the operator will be notified that a negative total has occurred after which the true negative total can be taken in a very simple manner.

In the embodiment illustrated, when a negative total occurs, the total keys are locked. This notifies the operator that a negative total exists. He then depresses a special release key which performs a multiplicity of functions and places the machine in condition for taking a negative total. He then depresses the total key and the true negative total is automatically taken.

The general object of the invention is to provide an improved calculating machine.

A more particular object is to provide improved negative total construction in a calculating machine.

Other objects and advantages will appear from the following specification and drawings.

An embodiment of the invention is shown in the accompanying drawings in which.

Figures 1, 2:
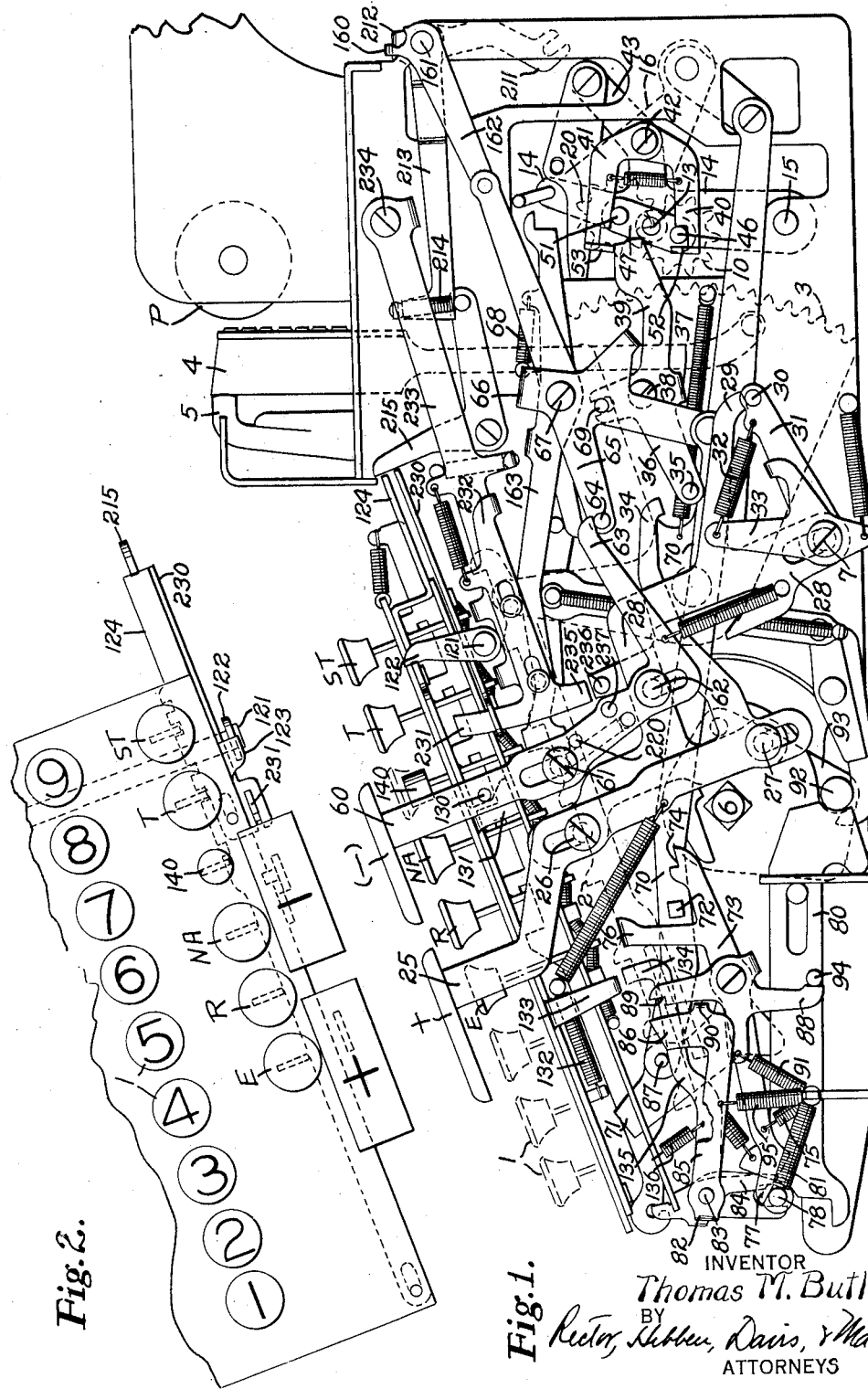
Figure 1 is a right side elevation of a machine embodying the invention, the casing having been removed and the parts being shown in normal addition condition.
Fig. 2 is a partial plan view of a portion of the keyboard showing the amount keys, the control keys, and the motor bars.

The invention is shown applied to a calculating machine known as the Burroughs portable. This machine is shown and described in detail in Horton Patent No. 1,853,050 and only its general features will be explained here.

General calculating machine features

The machine is provided with a plurality of banks of depressible amount keys 1 which, when the machine is operated, control the differential movement of stop bars 2 (Fig. 1) connected to actuator racks 3. Type bars 4 are connected to the actuator racks and a printing mechanism including the hammers 5 is provided for driving the differentially positioned type bars against paper held around the platen P.

The machine is provided with a main drive shaft 6 which, during the machine operation, is first rocked counterclockwise as viewed in Fig. 1 and then returned clockwise. This shaft may be operated by a hand lever or by a motor. The machine illustrated is a motor-driven machine although the motor has not been shown in the drawings. This motor is caused to give the machine a stroke of operation by rocking a shaft 7 (Fig. 1) clockwise and then allowing it to return counterclockwise to normal.

The machine is provided with suitable control keys including the total key T and the subtotal key ST as well as an error key E, a repeat key R and a non-add key NA. These keys control mechanisms that condition the machine to perform functions corresponding to the keys depressed, such control mechanisms being described in detail in the Horton patent referred to.

An addition-subtraction type of registering mechanism is provided which, in the machine illustrated, is of the "tumbling" type. It is provided with a suitable transfer mechanism for carrying and borrowing. The machine may be conditioned for either an addition or a subtraction type of engagement between the registering mechanism and racks. The registering mechanism will be later described in more detail.

The registering mechanism is moved into and out of engagement with the actuator racks to perform addition, subtraction, and to take totals and sub-totals by means of suitable driving connections between the main drive shaft and the registering mechanism which connections operate under the control of the various control keys of the machine. These driving connections and controls are explained in detail in said Horton patent and need not be illustrated or described here.

Registering mechanism

The registering mechanism is an addition-subtraction mechanism of the "tumbling register" type.

It comprises two sets of register pinions, one set comprising the addition pinions 10 and the other set comprising the subtraction pinions 20. The add pinions 10 are rotatably mounted on a shaft 11 (Fig. 3) and the subtract pinions are rotatably mounted on a shaft 21. The two sets of pinions are in mesh with one another so that when one set is rotated in one direction the other set will be rotated in the opposite direction.

The shafts 11 and 21 are carried by a tumbling frame 12 having studs 13 (Fig. 1) journaled in the side arms 14 of a main register frame which is rockable about a shaft 15 to rock the registers into and out of engagement with the actuator racks 3. The main register frame is rocked by a cam 16 (Fig. 3) which is actuated from the main drive shaft 6 of the machine under the control of the various control keys in a manner described in the Horton patent heretofore mentioned.

When addition is to be performed the registers occupy the position illustrated in Fig. 1, where the addition register pinions 10 are positioned for engagement with the actuator racks. During the forward stroke of the machine, the actuator racks 3 and the type bars 4 rise upwardly to differential positions after which the addition pinions are meshed with the racks. During the return stroke of the machine, the actuator racks are returned to normal and during this movement, the add pinions are rotated counterclockwise in Fig. 1 to accumulate the item that was entered on the amount keys.

Figure 4:
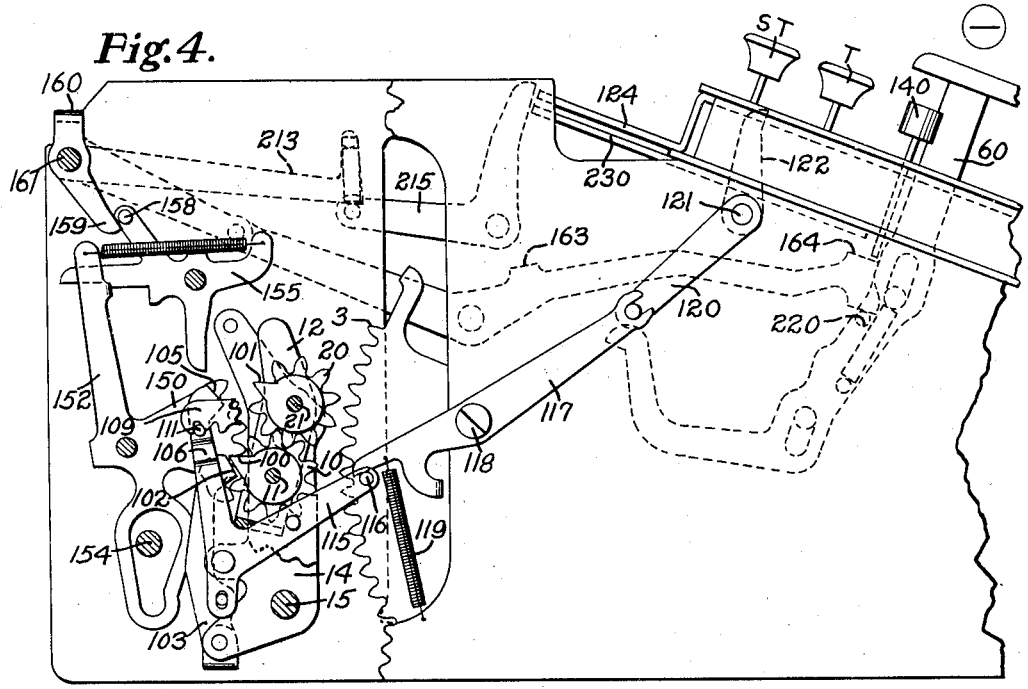
Fig. 4 is a partial left-side elevation showing particularly the registering and the "fugitive 1" mechanisms, the parts being shown in subtraction condition but not in negative total or overdraft condition.

When subtraction is to be performed, the register pinions occupy the position illustrated in Fig. 4 where the subtraction pinions 20 are in active position for engagement with the actuator racks. During the forward stroke of the machine the actuator racks rise to differential positions after which the subtraction pinions are meshed with the racks and, then, during the return stroke of the machine the actuator racks are returned to normal whereupon the subtraction pinions are rotated to enter the items subtractively in the registering mechanism. It will be observed that, since the subtraction pinions are meshed with the addition pinions, the addition pinions will be rotated clockwise as viewed in Fig. 1 during this subtraction operation, which is just the reverse of the direction in which they are rotated during an addition operation.

Addition (+) motor bar and controls

When addition is to be performed, it is merely necessary, after the amount keys have been depressed, to depress an addition motor bar. This bar is marked "+" in the drawings and it has a similar mark on its face in the actual machine.

When the add motor bar is depressed the machine automatically performs addition. If the machine happens to be in addition condition, no change in its condition is necessary for performing addition. But, if the machine happens to be in subtraction condition, it is necessary to change it to addition condition and one of the advantages of the machine is that this change takes place automatically and addition is performed by a single stroke of operation of the machine. In other words, no spacing strokes are required to condition the machine for addition if it happens to be in subtraction condition at the time it is desired to perform addition.

Referring to Fig. 1, the add motor bar "+" is mounted on a plate 25 which is slidably mounted on a stationary stud 26 on one of the side plates of the machine. The lower end of the plate 25 is also slidably mounted on a stud 27 carried by a slidable plate 28 which, for convenience, will be called the motor control plate. This plate 28 is slidably mounted at its upper end on the stud 26 and, on its lower end, on the motor control shaft 7. The mounting of the add bar plate 25 on the motor control plate 28 is such that, when the add bar is depressed, the downward movement of plate 25 will also move the plate 28 downward, but, if the add motor bar with its plate 25 is not depressed, the motor control plate 28 may, nevertheless, be moved downward under the control of the subtract motor bar as will be later described.

The motor control plate 28 has a rearwardly extending arm 29 positioned over a stud 30 on an arm 31 which is connected by a spring 32 to another arm 33 that is fixed to the motor control shaft 7 that causes the motor to give the machine a stroke of operation.

From the description thus far given it will be clear that when the add motor bar "+" is depressed, the plate 25 is moved downwardly and the engagement of this plate with the stud 27 will move the motor control plate 28 downward. As the plate 28 moves downwardly, its arm 29 will rock the arm 30 which, through the spring 32, will rock the arm 33 and the shaft 7. Accordingly, when the add motor bar is depressed, the machine will be automatically given a stroke of operation.

The slide plate 25 supporting the add motor bar has a rearwardly projecting arm 34 which, under certain conditions, engages a stud 35 on an arm 36 of a yoke 37 pivoted at 38. This yoke has a rearwardly extending control arm 39 that controls the tumbling of the registers through mechanism as follows:

Adjacent the registering mechanism is a latching means including two arms 40 and 41 pivoted at 42 to a support 43 (Fig. 3) which is an extension of one of the arms 14 of the main register frame. These latch arms are urged toward one another by a spring 44. The lower arm 40 has a notch 45 adapted to engage over a stud 46 on a member 47 fixed to a shaft 48 which is an extension of one of the studs 13 and which rocks with the tumbling register frame 12. The upper arm 41 has a notch 50 adapted to engage over a stud 51 on said member 47. The lower arm 40 also has an abutment 52 and the upper arm an abutment 53 between which the control arm 39 operates.

Figure 3:
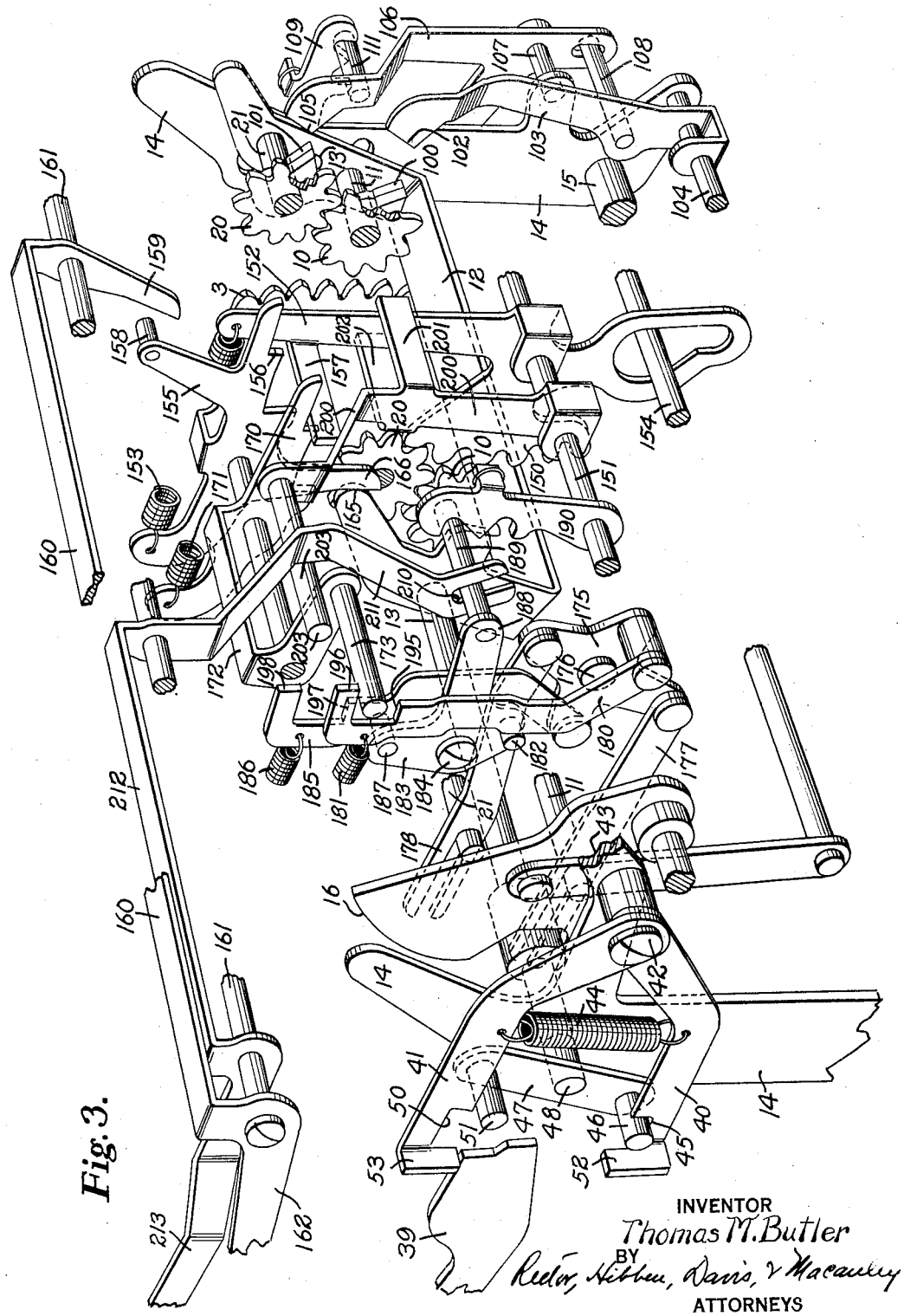
Fig. 3 is a perspective view of certain parts of the registering mechanism together with the associated construction for inserting the "fugitive 1", the parts being shown in normal addition condition.

When the parts are in addition condition, shown in Figs. 1 and 3, the notch 45 in the lower arm 40 is engaged over the stud 46 to latch the registering mechanism in addition condition. It will be observed that the stud 35 on the arm 36 of yoke 37 (Fig. 1) is a considerable distance below the projection 34 on the add-bar supporting plate 25. This distance is such that, when the add motor bar is depressed, the stud 35 will not be engaged by projection 34 to rock the yoke 37. Instead the projection 34 will simply move down to a final position which is just in contact with the stud 35. Accordingly, the control arm 39 and the latch arms 40 and 41 remain in the condition shown in Fig. 1 and the registering mechanism remains in addition condition which is the condition desired.

Figure 8:
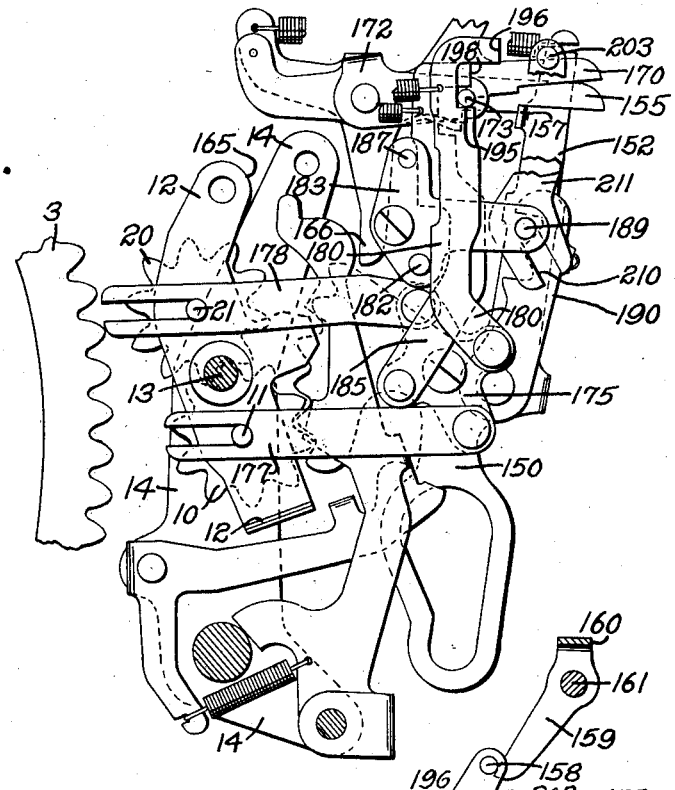
Fig. 8 is a view similar to Fig. 7 with the registering mechanism in subtraction condition and the parts in the position they occupy before an overdraft or negative total occurs and before the release key is depressed.

If, at the time the add motor bar is to be depressed, the registering mechanism is in subtraction condition, the register pinions are in the position illustrated in Fig. 8. The control arm 39 is, however, in the position of Fig. 1 because it is normally maintained in this position by a spring as will be later explained. Accordingly, the latch 41 is raised and the end of arm 39 is in front of stud 51. When the add motor bar is depressed, the arm 36 is not moved because it is already in the position of Fig. 1.

It will be recalled that, at the beginning of the return stroke of the machine in addition, the main register frame 14 is rocked toward the actuator racks.

As the main register frame moves toward the racks, with the parts conditioned as above explained, the stud 51 engages the end of arm 39 which acts as an abutment and the tumbling register frame 12 is automatically moved to addition position as the main register frame moves toward the racks. In this manner the register is automatically tumbled to addition condition as it is moved into engagement with the actuator racks.

An advantage of this construction to be noted is that the above action takes place during the stroke of operation of the machine that performs addition and that it is unnecessary to give the machine a spacing stroke to tumble the registers to get them in proper condition prior to operating the machine.

*Subtraction (—) motor bar and controls*

The subtraction (—) motor bar is arranged to control the machine so that, upon depression of the subtract bar, the machine automatically performs subtraction by a single machine operation, no matter whether the registering mechanism may have been in subtraction or in addition condition at the time the motor bar was depressed. No spacing strokes are required to condition the machine prior to its operation.

The subtract motor bar is carried by a supporting plate 60 (Fig. 1) slidably mounted on a stud 61 fixed to one of the side plates of the machine. The lower end of the plate is also slidably mounted upon a stud 62 on the motor control plate 28, the mounting being such that, as the subtract plate 60 is moved downwardly, the motor controlling plate 28 will also be moved downwardly to cause the motor to give the machine a stroke of operation. Accordingly, depression of the subtract motor bar (—) conditions the motor drive so that the machine is automatically given a stroke of operation.

The subtract bar supporting plate 60 has a rearwardly extending arm 63 positioned for engagement with a stud 64 on the arm 65 of a yoke 66 pivoted at 67 and urged clockwise by a spring 68. This yoke has a stud 69 positioned in the bifurcated end of an upstanding arm of the yoke 37, the connection being such that, when yoke 66 is rocked counterclockwise, the yoke 37 will be rocked clockwise.

If, when the subtract motor bar is depressed, the registering mechanism is already in subtraction condition, it will occupy the position illustrated in Fig. 8. Under these conditions the control arm 39 will be in the position of Fig. 1 because of its being urged to this position by spring 68 acting on yoke 66. The stud 64 is immediately below the arm 63 of the subtract bar supporting plate 60. When the subtract motor bar is depressed, the arm 63 will engage the stud 64 to move the yoke 66 to move control arm 39 to its lower position. As the registering mechanism moves toward the racks no tumbling of the registers occurs because they are already in the position for which control arm 39 is set by depression of the subtract motor bar. Accordingly, the registering mechanism remains in subtraction condition.

If, however, the registering mechanism is in addition condition at the time the subtract motor bar is depressed, the parts will initially be in the position illustrated in Fig. 1. It will again be observed that the stud 64 on arm 65 of the yoke 66 is immediately under the arm 63 of slide plate 60. Accordingly, when the subtract motor bar is depressed, the yoke 66 will be rocked counterclockwise. This will rock the yoke 37 clockwise and move the arm 39 downward. As the arm 39 moves downward it engages the abutment 52 of latch arm 40 and moves the arm to released position so that the registers are free to be tumbled. At the same time the end of arm 39 moves in front of stud 46. At the beginning of the return stroke of the machine during the subtraction operation, when the main register frame 14 is rocked toward the actuator racks, the stud 46 will engage the end of arm 39 and the tumbling register frame 12 will be rocked to tumble the registers to subtract position. This occurs automatically as the registers move toward the actuator racks. Here again, it is to be observed, that no spacing strokes are required to condition the machine for subtraction. The machine is automatically conditioned during the subtraction operation and only a single stroke of operation is required to perform subtraction, no matter whether the registering mechanism was in addition or subtraction condition at the time the subtract motor bar was depressed.

In the embodiment of the invention illustrated, the control arm 39 is normally maintained in addition position. The spring 68 which urges the yoke 66 clockwise tends to normally maintain the arm 39 in the position illustrated in Fig. 1, which is its addition position. When the subtract motor bar is depressed, the yoke 66 is rocked counterclockwise against the tension of spring 68 to place the controls in subtraction condition. The operator generally releases the motor bar as soon as he has depressed it so that it becomes necessary to latch the controls in subtraction condition until after the subtraction operation has taken place. This is accomplished by the following construction.

Connected to a downwardly-extending arm of yoke 66 (Fig. 1) is a link 70 that extends to the front of the machine where it is pivoted to a pivoted arm 71. The link 70 carries a square stud 72 with which a latch 73 cooperates. The latch 73 has a shoulder 74 adapted to engage over the stud 72, the latch being urged counterclockwise by a spring 75. As the link 70 moves rearwardly while the machine is being conditioned for subtraction, the stud passes over the shoulder of the latch and, after the stud passes the latch, the latter snaps up behind the stud to hold the link rearward and maintain the controls in subtraction condition. The latch 73 has an upwardly extending portion 76 positioned under the stem of the error key E to enable the latch to be released, if desired, by depression of the error key.

The latch 73 must be released after a subtract operation but it must not be released until near the end of the machine operation during which subtraction is being performed. For the purpose of releasing the latch it is provided with a forwardly extending foot 77 having an inclined edge engaging the control rod 78 which is a standard part of the machine described in said Horton patent. This control rod normally occupies the position illustrated in Fig. 1 where it is held by a slide plate 80 but, during the forward stroke of the machine the plate 80 moves rearwardly which releases the control rod and the latter is moved rearwardly a limited distance under the urge of a spring 81. As the control rod 78 moves rearwardly it engages the inclined edge of the foot 77 of latch 73 and rocks the latch clockwise to released position.

But the control rod 78 moves rearward during the forward stroke of the machine and it is not desired that the yoke 66 and associated parts return to addition condition at this time. Accordingly, additional mechanism is provided for delaying the return until the end of the machine operation.

Referring again to Fig. 1, a yoke 82 is provided pivoted on a shaft 83. This yoke has a downwardly-extending arm 84 located behind the control rod 78. The yoke also has a rearwardly extending arm 85 provided with an upstanding end 86, adapted to cooperate with a stud 87 on the link 70. As the link 70 moves rearwardly while the machine is being conditioned for subtraction, the stud 87 passes the part 86. The control rod 78 then moves rearward during the forward stroke of the machine and rocks the yoke 82 counterclockwise. This thrusts the upwardly extending end 86 of arm 85 in front of the stud 87 to temporarily latch the link 70 in its rearward position. The yoke 82 is prevented from returning to normal by a pivoted latch 88 having a shoulder 89 adapted to engage over a lug 90 on the arm 85, the latch 88 being urged counterclockwise by a spring 91. Near the end of the return stroke of operation of the machine a stud 92 on the main drive plate 93 of the machine engages the slide plate 80 and moves it forward again. This slide carries a stud 94 adapted to engage a downwardly-projecting arm of latch 88 and, near the very end of the return stroke of operation, the latch 88 is rocked clockwise to release the arm 85 of yoke 82 which is thereupon moved downwardly by its spring 95 out of the path of stud 87. This frees the link 70 which may then move forwardly under the urge of spring 68 which rocks yoke 66 clockwise at the same time. The rocking of yoke 66 clockwise conditions the parts so that, upon the next machine operation, the registers will be automatically tumbled to addition condition unless the subtract motor bar is again depressed.

Negative total lock

When the registering mechanism goes from positive to negative condition the total keys are locked against depression and the mechanism that accomplishes this result is called the negative total lock. It is controlled by the pinions of highest order of the registering mechanism. It is to be understood that another member or members of the machine could be locked instead of the total keys. Such a member could be, for example, the motor bar.

Referring to Fig. 3, the pinion of highest order of the addition pinions 10 is provided with a projection 100 in the nature of a transfer projection and the pinion of highest order of the subtraction pinions 20 is provided with a like projection 101. The projection 100 is adapted to cooperate with the nose 102 of a pawl 103 pivoted on a shaft 104 supported by and movable with the main register frame 14. The projection 101 is adapted to cooperate with the nose 105 of a pawl 106 pivoted on a stud 107 also supported by the main register frame. These two pawls are connected together by a pin 108 which is connected to the pawl 106 below its pivotal axis 107 and to the pawl 103 above its pivotal axis 104 so that, when one pawl is moved clockwise, the other is moved counterclockwise and vice versa. The pawl 106 is slotted to permit radial movement of pin 108. The pawls are releasably held in the positions to which they are moved by a detent 109 urged by a spring 110 (Fig. 5) into engagement with a stud 111 carried by the pawl 106.

Referring to Fig. 4, the pawl 106 has a forward extension 115 provided with a stud 116 engaging under the edge of a lever 117 pivoted at 118 and urged counter-clockwise by a spring 119. The upper end of lever 117 has a pin and slot connection with an arm 120 fixed to a shaft 121 supported in the machine side frames that extends across the machine. On its opposite end the shaft 121 is fixed to an arm 122 which is adapted to engage a lug 123 (Fig. 6) on a lock plate 124 for the total keys. This lock plate passes through slots 125 and 126 in the total and sub-total keys T and ST, respectively, and the plate has slots 127 and 128 in it that normally occupy the position shown in Fig. 6 in registration with the key stems of the keys T and ST. In other words, under normal conditions, the total key T and the sub-total key ST can be depressed as their stems are free to move through the slots 127 and 128 respectively.

When the registering mechanism is in subtraction condition, but before a negative total or overdraft occurs, the parts occupy the position illustrated in Fig. 4. If, while the parts are in this position, a negative total occurs, the pinion 10 of highest order will move counterclockwise from the position illustrated in Fig. 4 and the pawl 103 will be cammed counterclockwise by the projection 100. This movement of pawl 103 causes the pawl 106 to be moved clockwise and the stud 116 is thereby lowered from under the edge of lever 117 to its Fig. 5 position. The spring 119, thereupon, rocks the lever 117 counterclockwise which rocks shaft 121 clockwise and moves the upper end of arm 122 forward to move the lock plate 124 forward or to the left in Fig. 6, so that the slots 127 and 128 are no longer in registration with the stems of the total keys, but instead, the plate 124 enters the slots 125 and 126 of the total keys to lock them against depression.

While the tension of spring 119 can be made sufficient to move the lock slide 124 forward, further provision has been made for positively moving this slide plate forward each time that the subtract motor bar is depressed. As shown in Fig. 1, the subtract motor bar is provided with a stud 130 which is adapted to engage the cam edge of a downwardly extending lug 131 (Fig. 6) on the lock plate 124. Accordingly, each time that the subtract motor bar is depressed, the lock plate 124 is moved forward to locking position. If no negative total occurs during the machine operation, the lock plate returns to normal under the tension of its spring 132 (Fig. 1) at the end of the machine operation. But, if a negative total occurs during the machine operation, the arm 122 moves forward to hold the lock plate in the position to which it has been moved by the subtract motor bar, thereby locking the total keys until they are otherwise released as will be explained later.

Figure 5:
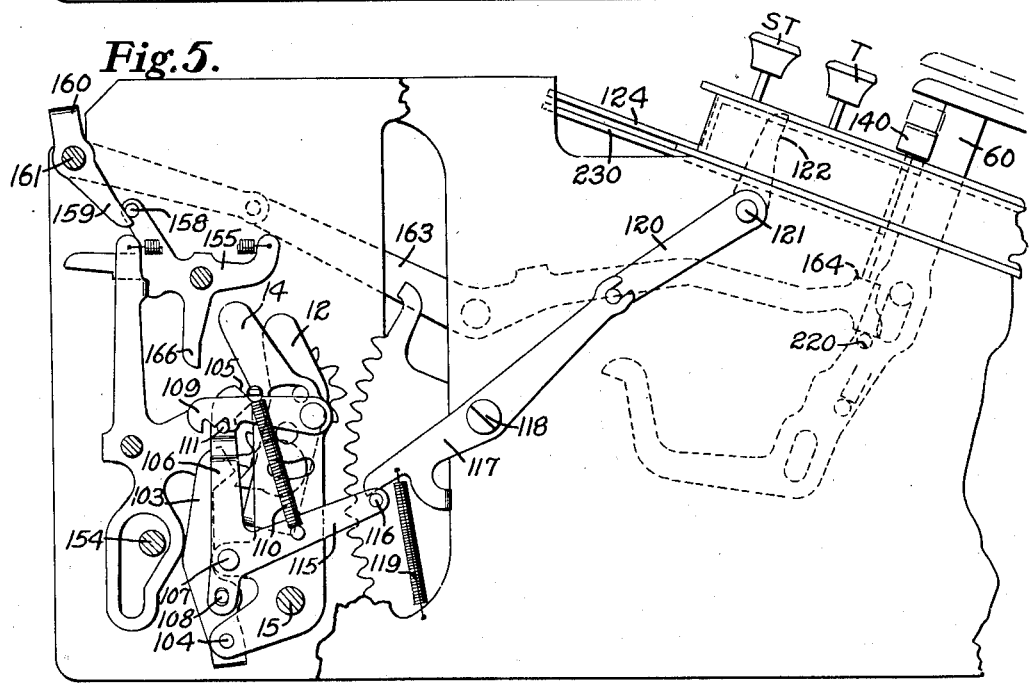
Fig. 5 is a view similar to Fig. 4 except that the parts are shown in the positions they occupy after an overdraft has occurred and after the "fugitive 1" has been entered.

Referring to Fig. 5, let it be assumed that the parts occupy the position shown which is the position after a negative total occurs. Assume that the registers are then tumbled to add condition. This will place the projection 101 on pinion 20 in the position to engage the nose of pawl 106 when the pinion is rotated counterclockwise. If, when the parts are in this position, the machine changes from negative to positive condition the pinion 20 will rotate counterclockwise and the pawl 106 will be cammed counterclockwise. This causes the stud 116 to engage the edge of lever 117 and rock the lever clockwise which will rock the shaft 121 counterclockwise to remove arm 122 from its engagement with the lug 123 of lock plate 124, thereby releasing the lock plate for return to normal under the influence of its spring 132.

From the description given it should be clear that, when a negative total occurs, the negative total lock locks the total keys against depression and, when the machine returns from negative to positive condition, the negative total lock is released.

Because the subtract bar restores immediately as soon as pressure on it has been removed, it is desirable to retain the locking slide 124 in the forward position to which it is moved by depression of the subtract motor bar. For this purpose the slide is provided with a downwardly extending lug 133 (Fig. 1) which, when the slide is moved forwardly, moves forward of an upstanding lug 134 on an arm 135 pivoted on the shaft 83. This arm is normally retained in the position of Fig. 1 by the stud 87 on the link 70. But, when the machine goes to subtraction condition during a machine operation, the link 70 moves rearwardly and releases arm 135 which moves up to the rear of lug 133 under the influence of spring 136 and holds the locking plate 124 in forward position. Near the end of the subtraction machine operation, the link 70 is moved forward again whereupon the stud 87 cams the arm 135 down to release the locking plate 124 for movement to the rear.

Since the pawl 106 which controls lever 117 is carried by the register frame which rocks to move the registers into and out of engagement with the racks, the arm 115 of the pawl with its stud 116 is moved slightly to release the lever 117 as the registers are rocked into engagement with the actuator racks during various machine operations. This means that the spring 119 may move the lever 117 slightly and move the latch plate 124 forward slightly to lock the total keys. This is not harmful because it is desired to have the total keys locked during a machine operation. At the end of the machine operation the registers are rocked out of engagement with the actuator racks and the parts restored to normal condition except, of course, where a negative total has occurred as will be explained in more detail later.

Release key and connections

Figure 6:
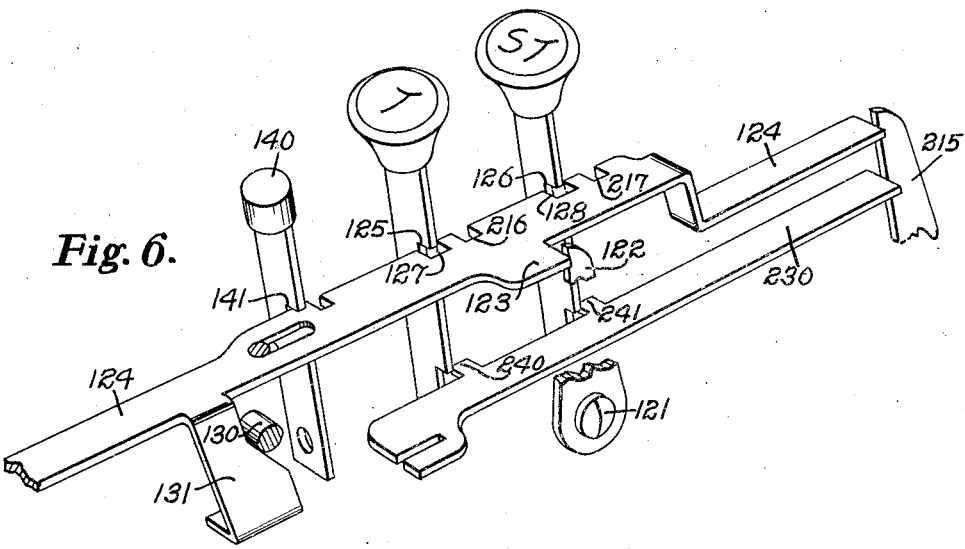
Fig. 6 is a partial perspective view showing the locking means for certain of the control keys.

After a negative total occurs and the total keys have been locked, it is necessary to unlock them in order to operate the machine. This is accomplished by means of a special release key 140 positioned near the total key T and provided with a restoring spring of the type shown in the Horton patent referred to which urges the key to undepressed position. This release key is normally locked against depression as shown in Fig. 6 by the engagement of the edge of the locking plate 124, in a notch 141 in the stem of the special release key. But when the locking plate 124 is moved to its position for locking the total keys, a notch 142 in the plate moves into registration with the stem of the release key 140 so that the latter can be depressed. Accordingly, when the total keys are locked upon a negative total occurring, the release key is unlocked and may be depressed. Depression of the release key accomplishes a number of different functions which will be described separately and which are as follows:

1. It inserts the "fugitive 1".
2. It causes the total key to be released.
3. It conditions the machine as for subtraction.
4. It causes an automatic operation of the machine.

1. "Fugitive 1" mechanism

After a negative total occurs, the "fugitive 1" is inserted in subtraction direction in the units order of the registering mechanism by a spring operated mechanism which is released by depression of the special release key 140.

Referring to Fig. 3, a "fugitive 1" segment 150, similar to the transfer segments of the registering mechanism, is provided for the units order pinions. It is positioned so that, when the registers are in addition condition, the subtract pinions 20 of the units order engages the segment 150 as illustrated in Fig. 3 and, when the registers are in subtract position, the add pinion 10 of the units order engages the segment. This enables the "fugitive 1" to be subtracted or added as the case may be. The "fugitive 1" segment 150 is pivoted on a shaft 151 and provided with an upwardly extending arm 152 to which a spring 153 is connected which urges the segment counterclockwise as viewed in Fig. 3. The segment is restored by a restoring bail 154 at the same time that the transfer segments are restored, that is, during the return stroke of each machine operation.

The "fugitive 1" segment 150 is restrained against movement by a latch 155 having a shoulder 156 adapted to engage over a lug 157 on the segment arm 152. This latch has an upward extension carrying a stud 158 adapted to be engaged by one arm 159 of a bail 160 pivoted on a shaft 161. This bail has a forwardly extending arm 162 (Fig. 3) connected to one end of a pivoted lever 163 (Fig. 4) whose forward end has an abutment 164 positioned beneath the stem of the release key 140.

When the release key 140 is depressed to the position of Fig. 5, the lever 163 is rocked clockwise which rocks the bail 160 counterclockwise. The arm 159 engages the stud 158 and rocks the latch 155 clockwise as viewed in Fig. 4 thereby releasing the "fugitive 1" segment 150 which is moved by its spring to insert the "fugitive 1" in subtraction direction in the units order.

When the registering mechanism returns from negative to positive condition, it is again necessary to insert a "fugitive 1", but, in this instance, in the reverse or add direction. But, since the release key 140 is not employed when the registering mechanism changes to positive condition, it becomes necessary to provide some other means for inserting the "fugitive 1" when the said registering mechanism changes from negative to positive condition.

For this purpose the tumbling register frame 12 is provided with a nose 165 (Fig. 3) adapted to engage a downwardly extending portion 166 of a lateral lug on latch 155. The nose is shaped and positioned so that, when the registering mechanism is in add position and, when the register frame is rocked to move the registers out of engagement with the racks near the end of the machine operation, the nose 165 engages the extension 166 to release the latch 155.

It will be observed that the insertion of the "fugitive 1" in add direction depends upon the tumbling of the registering mechanism to addition position and a machine operation rather than upon the change of the registering mechanism from positive to negative condition.

A number of different conditions occur which make it advisable to provide another governing mechanism for the "fugitive 1" segment. Referring to Fig. 3, a second latch 170 is provided for the "fugitive 1" segment 150, this latch being urged clockwise as viewed in Fig. 3 by a spring 171. The latch 170 is one arm of a pivoted yoke 172 whose other arm carries a stud 173.

Figure 7:
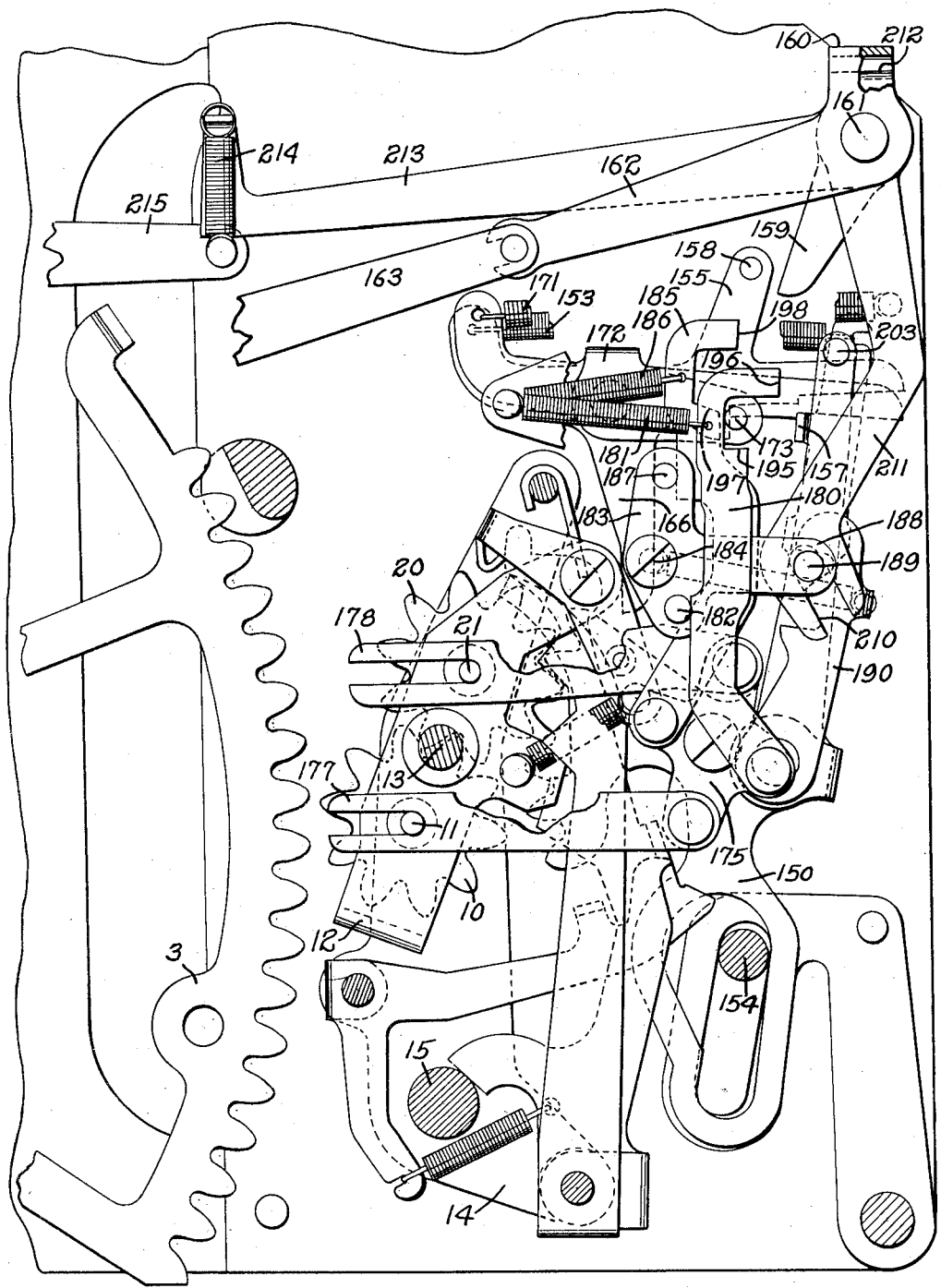
Fig. 7 is a right side elevation of a portion of the registering mechanism and the associated parts that control the "fugitive 1", the register being shown in addition condition.

Referring to Figs. 3, 7 and 8, a four-armed member 175 is provided which is pivoted to a stationary frame stud 176. Pivoted to the lower arm of this lever and extending forwardly is a link 177 having a slotted end engaging over the end of the shaft 11 on which the add pinions 10 are mounted. Pivoted to the upper arm of the four-armed member is another link 178 having a slotted end engaging over the end of the shaft 21 on which the subtract pinions 20 are mounted. It will be apparent that, when the registers are tumbled, the four-armed member 175 is rocked with them.

Pivoted to the rear arm of the four-armed member 175 is a vertical link 180 urged counterclockwise as viewed in Fig. 3 by a spring 181 but limited in its movement by engagement with a stud 182 on a member 183 pivoted at 184.

Pivoted to the forward arm of the four-armed member 175 is another vertical link 185 urged counterclockwise as viewed in Fig. 3 by a spring 186 and limited by engagement with a stud 187 on member 183. The member 183 has a rear extension 188 (Fig. 3) carrying a stud 189 cooperating with notches in a pivoted spring urged detent 190 whereby the member 183 is releasably held in the positions to which it is moved.

The upper end of the vertical link 180 is provided with a shoulder 195 and a bent end 196 which serve to form a notch in which the stud 173 on yoke 172 may be positioned, the notch being longer than the diameter of the stud so that the stud can have a limited movement in the notch.

The upper end of the vertical link 185 has a shoulder 197 and a bent end 198 forming a notch also adapted to cooperate with the stud 173, said notch also being longer than the diameter of the stud.

When the machine is in addition condition with the registering mechanism "0", or with a positive total in it, the parts occupy the position illustrated in Fig. 7. It will be observed that the stud 173 is in the slot in the vertical link 180 and that the vertical link 185 is held back out of the path of the stud.

With the parts in this position, assume that the registering mechanism is changed to subtract condition which, it will be recalled, occurs automatically as the machine starts to operate when the subtract motor bar has been depressed. As the registers are tumbled counterclockwise in Fig. 7, the four-armed member 175 is rocked counterclockwise. This moves the vertical link 180 upward and pulls the vertical link 185 downward, the parts then occupying the position of Fig. 8. As the vertical link 180 moves upward its shoulder 195 engages the stud 173 and rocks the yoke 172 counterclockwise to lift the latch 170 above the lateral lug 157 on the "fugitive 1" segment arm 152, as shown in Fig. 8. As the link 185 moves downward, its shoulder 197 moves lower than the stud 173 and the bent end 198 of said link engages over the stud 173 as shown in Fig. 8. Briefly stated, the result is, that, when the registering mechanism is tumbled to subtract condition, the latch 170 is raised so that the "fugitive 1" segment may be released, but, of course, it will not be released unless the latch 155 is also raised.

While the registering mechanism is in this subtraction condition other items may, of course, be subtracted without inserting a "fugitive 1" because the latch 155 is not released.

If, while the registering mechanism is in this subtraction condition, an item is added, the registering mechanism will be again tumbled to add position and, during this operation, the nose 165 will raise the latch 155. This would release the "fugitive 1" segment were it not for the fact that the latch 170 is reset to hold the segment before the latch 155 is released. The resetting of the latch 170 is due to the fact that, as the registering mechanism tumbles back to addition position, the links 180 and 185 are returned from their Fig. 8 to their Fig. 7 position. In other words, the link 180 is pulled downwardly and the link 185 moved upwardly. As the link 180 moves downwardly, its shoulder releases the stud 173 and allows the latch 170 to move to latching position under the influence of its spring. The parts are timed so that this latch comes into action before the latch 155 releases the segment arm 152.

Accordingly, as long as the machine is used for simple add-subtract operations without any manipulation of the special release key 140 to insert a "fugitive 1", no "fugitive 1" will be inserted at any time even though the nose 165 may release latch 155 during the add operations.

Assume, again, that the registering mechanism has been tumbled to subtract condition and the latch 170 released. As long as the total remains positive, nothing can happen with respect to the "fugitive 1" because the special release key 140 remains locked. But assume, now, that a negative total occurs. This releases the key 140. Assume that key 140 is depressed. When it is depressed, the latch 155 is released and since the latch 170 has already been released, the "fugitive 1" segment arm 152 is free to move. It does move and a "fugitive 1" is inserted in subtraction direction.

After the "fugitive 1" has thus been inserted in subtraction direction, a number of different conditions may arise. For example, a negative total may be taken and the registering mechanism cleared but left in negative position. Or a negative total may be taken as a sub-total leaving the negative total in the registering mechanism after which further items may be subtracted or added. The added items may or may not change the negative total to a positive one. Further mechanism has been provided to control the machine under these varying conditions and this mechanism will be described after which different conditions will be assumed and the operation explained.

Referring to Fig. 3, an arm 200 is pivoted beside the "fugitive 1" segment arm 152 and provided with two lugs 201 and 202 which are astride the arm 152. The arm 200 carries a stud 203 adapted to be positioned in front of the lateral ends 196 and 198 of the links 180 and 185, respectively. When the "fugitive 1" segment arm 152 is moved the arm 200 moves with it which, of course, carries a stud 203 in the direction of movement of the arm.

When the "fugitive 1" segment arm 152 is released by the release key 140, the registering mechanism is always in subtract position because depression of the release key 140 causes an automatic operation of the machine that places the registering mechanism in subtraction position, and this movement to subtract position occurs before the arm 152 moves because the latch 170 must be released to release arm 152 and latch 170 is not released until the registering mechanism moves to subtract position and is moved out of engagement with the actuator racks and into engagement with the tens transfer segment at the end of a return stroke.

As the segment arm 152 moves counterclockwise, as viewed in Figs. 3 and 7, the arm 200 moves with it and the stud 203 moves to the left. Since the registering mechanism is in subtract position, the end 196 of link 180 is in the path of the stud 203 as shown in Fig. 8. The latter engages the end 196 and moves the link 180 counterclockwise to the position of Fig. 9. The rear edge of the link 180 engages the stud 182 on the member 183 and, as the link 180 moves counterclockwise, the member 183 is rocked clockwise from the position of Fig. 8 to that of Fig. 9, the member 183 being held in this position by the spring detent 190. As the member 183 is rocked clockwise, the stud 187 engages the rear end of link 185 and moves it from the position of Fig. 8 to that of Fig. 9.

Figure 9:
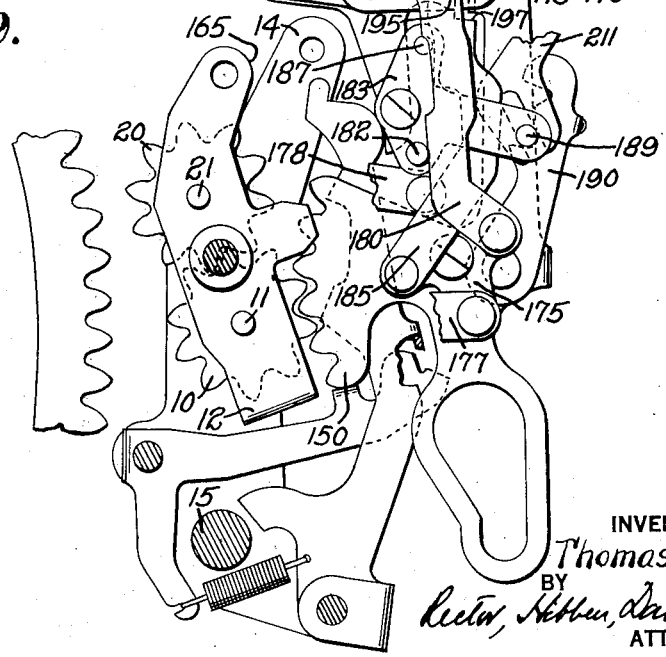
Fig. 9 is a view similar to Fig. 8 with the parts in the position they occupy after a negative total has occurred and after the release key has been depressed.

It will be noted, by referring to Fig. 9, that the stud 173 is in the upper end of the notch in link 185 and that the shoulder 195 of link 180 has been moved from under the stud 173 so that the stud is free to move downward, in which direction the stud is urged by the spring 171 which acts on the latch 170. The stud 173 and latch 170 do not move down immediately, however, because the latch is on top of the lug 157 of the "fugitive 1" segment arm 152, which was released at the time the "fugitive 1" was entered. However, as soon as the "fugitive 1" segment arm is restored, as it is during the next machine operation, the latch 170 moves down behind the lug 157 and the stud 173 moves downward from the position of Fig. 9.

Assume, now, that the parts are in the position of Fig. 9, that is, assume that a negative total has occurred and that the release key 140 has been depressed so that the "fugitive 1" has been inserted, the registering mechanism being in subtraction condition. Assume next that a negative total is taken which clears the register.

Since the negative total is taken directly from the registering mechanism while the latter is in subtraction condition, the registering mechanism remains in subtract position at the end of the negative totaling operation. During this operation, the "fugitive 1" segment arm 152 has been restored and both of the latches 170 and 155 have snapped down to latched position to hold the "fugitive 1" segment arm against another movement. The machine is then ready for the next operation.

It will be appreciated that, as far as the position of the parts are concerned, the same condition could be created by taking a negative total as a sub-total which would leave the negative total in the registering mechanism. Such an operation would leave the registering mechanism in subtract condition and would cause both the latches 155 and 170 to move to latched position to hold the "fugitive 1" segment arm 152. The only difference from the first condition above mentioned would be that the registering mechanism would contain an amount while being in negative position, whereas, in the first assumption, the register would be in negative position but at zero.

Before assuming further operations it would be well to mention that no harm could be done by further attempted depression of release key 140. This release key cannot, in fact, be depressed because it was locked against depression as will be later described. Even if the release key 140 could, in some way, be depressed, another "fugitive 1" could not be inserted because such depression would not release the latch 170. It would merely release the latch 155. But the latch 170 would hold the "fugitive 1" segment against movement, so a second "fugitive 1" could not be inserted by misoperation of the release key.

Assume that, with the register in negative condition, and with the "fugitive 1" segment latched by both the latches 155 and 170, items are subtracted. This produces no change in the condition of the parts as far as the "fugitive 1" mechanism is concerned because the registering mechanism remains in subtraction position so that the latch 170 is not affected. Likewise, the release key 140 cannot be depressed and the latch 155 will not be disturbed.

Figure 10:
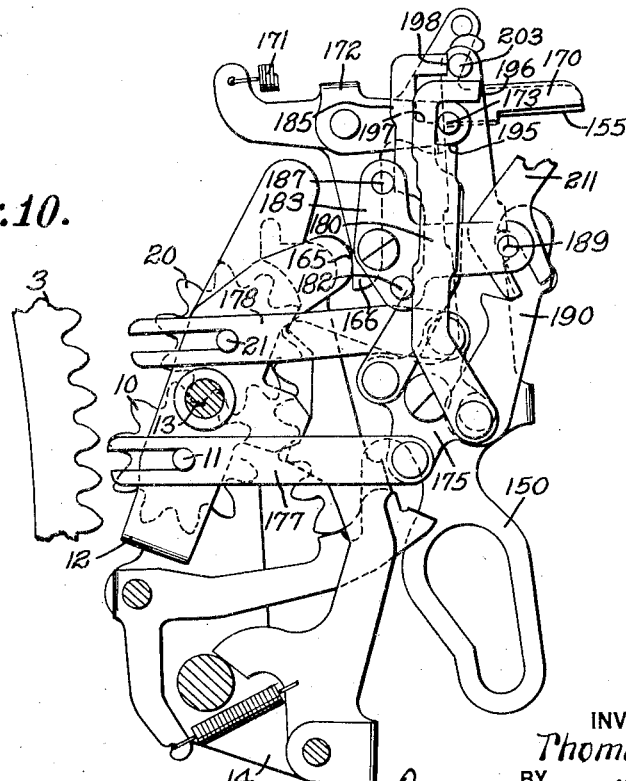
Fig. 10 is a view similar to Fig. 9 with the mechanism moved from subtract to add condition after an overdraft has occurred and after the machine has been operated.

But, assume that with the register in negative condition, items are added. During the add operation the registering mechanism is tumbled from subtract to add position and moved into and out of engagement with the rack so that the nose 165 releases the latch 155. When the register is tumbled from subtract to add position, the links 180 and 185 are moved from the position of Fig. 9, that is the link 180 is pulled downwardly and the link 185 is pushed upwardly. As the link 185 moves upwardly, its shoulder 197 engages stud 173 and raises the latch 170. Since the latch 155 has already been released the "fugitive 1" segment arm 152 is thus free to operate and it moves to insert a "fugitive 1" in add direction. As it moves, the stud 203 engages the end 198 of link 185 and moves the latter to the position of Fig. 10. The rear end of link 185 engages stud 187 and moves the member 183 to cause stud 182 to move link 180 to the position of Fig. 10, the parts being held in position by the detent 190.

If the added item changes the registering mechanism from negative to positive condition, the latter is then in proper condition for the taking of the positive total, that is, the "fugitive 1" has been inserted in add direction to insure that the correct amount is in the register. Items may then be added or subtracted without disturbing the condition of the "fugitive 1'" mechanism. As each item is added the latch 155 is released, but the latch 170 is not. When items are subtracted, the nose 165 does not act and hence latch 155 is not released. When the register is tumbled to subtract position the link 180 is raised and its shoulder 195 engages stud 173 to raise the latch 170, but since latch 155 is not released the "fugitive 1" segment arm does not move.

If the item added during the above assumed operation does not change the register from negative to positive condition, the registering mechanism is not in correct negative condition. In order to put it in correct condition a "fugitive 1" must be inserted in subtract direction. This is insured by reason of the fact that a negative total cannot be taken as long as the registering mechanism is in add position. The negative total lock is effective to prevent depression of the total keys. In order to depress these keys, the special release key 140 must be depressed and, when this special release key is depressed, the latch 155 is raised. Then, when the machine is operated, it is automatically returned to subtract condition and, as it returns to subtract condition, the link 180 is raised which raises the latch 170 and the "fugitive 1" is automatically inserted.

To recapitulate, it will be seen that, starting with the register in positive condition, items may be added or subtracted without a "fugitive 1" being inserted at any time. This is true even though the register goes to negative condition. No "fugitive 1" will be inserted until the machine is conditioned for the taking of a negative total.

If the register goes negative and the special release key is depressed, a "fugitive 1" will be inserted in subtract direction and the machine will be automatically conditioned for the taking of a true negative total.

After this negative total is taken, if another item is added, the machine is automatically changed to addition condition and a "fugitive 1" inserted in add direction so as to place the machine in proper condition for the taking of a positive total.

If, after the register has gone negative, a negative total is taken as a sub-total, leaving a negative amount in the register and if items are then added but without changing the total to a positive total, a "fugitive 1" is inserted in add direction at the time the registering mechanism is changed to add condition but, if the item added does not change the total to a positive total, no total can be taken without depressing the release key 140 and, when this key is depressed, the "fugitive 1" will be inserted in subtract direction to again place the registering mechanism in correct condition for the taking of a true negative total.

Provision is also made for preventing more than one "fugitive 1" being inserted by the movement of the registers into and out of engagement with the racks while in add position or by attempted or actual depression of the release key at the wrong time.

To recapitulate, after a negative total occurs, a "fugitive 1" is inserted by depression of the release key. The release key is locked against a second depression as long as the registering mechanism remains in subtract position with a negative total in it. This prevents a second "fugitive 1" being inserted. In addition, even if the release key were to be depressed a second time, a second "fugitive 1" would not be inserted.

2. Release of total keys

Depression of the special release key 140 also releases the total keys as follows:

Upon depression of the release key 140, the "fugitive 1" segment 150 moves counterclockwise as viewed in Fig. 3 to insert the "fugitive 1", and the arm 200 is rocked counterclockwise, which moves stud 203 forward. Stud 203 moves link 180 counterclockwise and link 180 rocks member 183 clockwise. The stud 189 in the rearwardly extending arm 188 of member 183 operates in a cam slot 210 in one arm 211 of a yoke 212 pivoted on shaft 161. This yoke has a forwardly extending arm 213 which is connected by a spring 214 (Fig. 1) to one arm of a pivoted bell crank lever 215 whose other arm extends upward and is positioned behind the locking plate 124 for the total keys. When the yoke 212 is rocked clockwise as viewed in Fig. 1, which is when the "fugitive 1" segment moves as above explained, it tends to rock the bell crank lever 215 counterclockwise and push the lock plate 124 forward. But the lock plate cannot be immediately moved forward because it is held against movement by the depressed release key which is latched down by its latch plate, and not released until near the end of the machine operation. The result is that the spring 214 is tensioned. Near the end of the machine operation, the release key 140 is released and, when it moves upwardly, the lock plate 124 is released, whereupon the spring 214 moves the bell crank 215 and the latter moves the lock plate 124 forward to cause the slots 216 and 217 (Fig. 6) to register with the stems of the total and sub-total keys. The slot 142 in the plate is moved past the stem of the release key 140 with the result that, while the total and sub-total keys are released, the special release key is locked. This means that the total or sub-total key can be depressed to take a negative total or sub-total, but the release key is locked against a second depression.

When a negative total is taken the register is cleared and when a negative sub-total is taken the negative total remains in the register, but, in both cases, the registering mechanism remains in subtraction condition. The negative total lock has not been restored to normal, but the total keys are free although the release key 140 is locked, the condition of the keys being due to the fact that the lock plate 124 is still held forward in the position to which it was moved by the lever 215. But, when the registers are tumbled to add position, which they are during the next add operation of the machine, the position of links 180 and 185 is changed and member 183 is rocked counterclockwise which rocks yoke 212 counterclockwise and moves bell crank 215 to released position. This releases the lock plate 124 and, since the negative total lock lever 122 is also released when the register goes to positive condition, the lock plate 124 is completely released for return to normal under the influence of its spring 132. But, if the total in the registering mechanism remains negative under the above conditions, the arm 122 will remain in position to hold the lock plate 124 so that the total and sub-total keys will be locked, but the release key will be released for depression.

To recapitulate, depression of the release key 140 causes the "fugitive 1" to be inserted and the total keys to be released.

3. Conditioning the machine for subtraction

Depression of the release key 140 also conditions the machine for subtraction, if it is not already in this condition, through connections as follows:

Referring to Fig. 1, the lever 163 which is rocked counterclockwise by depression of the release key 140 has a lower abutment positioned over a stud 220 on the plate 60 that supports the subtract motor bar. Accordingly, when the release key 140 is depressed, the subtract motor bar plate 60 is moved downwardly and this automatically conditions the machine for subtraction. In other words, it moves the yoke 66 and positions the arm 39 so that, as the registering mechanism moves toward the actuator racks, it is automatically tumbled to subtract condition. This action takes place during a single stroke of operation of the machine.

4. Causing an automatic operation of the machine

Depression of the release key 140 also causes an automatic operation of the machine.

As above mentioned, the lever 163, which is rocked counterclockwise by depression of the release key, has an abutment positioned over a stud 220 on the plate 60 supporting the subtract motor bar. But it will be recalled that the subtract motor bar plate 60 is mounted so that, when it is depressed, it moves the motor control slide plate 28 downwardly to cause an automatic operation of the machine. Consequently, depression of the release key will cause the motor to give the machine a stroke of operation.

Taking a true negative total

After the release key 140 has been depressed, as above described, it is merely necessary to depress the total or the sub-total key to obtain a true negative total or sub-total.

It will be recalled that depression of the release key results in inserting a "fugitive 1" in the registering mechanism, in releasing the locked total keys, and in causing the machine to be given an operation to place it in subtraction condition. This operation is given the machine in order to be sure that the registering mechanism will be in subtraction condition when the negative total is taken. In the event the registering mechanism is in this condition at the time the release key is depressed, it would not be necessary to give the machine a stroke of operation but, in order to be sure that the machine is always properly conditioned, it is given a stroke of operation, no mattter whether the registering mechanism is in subtract or add position.

After this operation, the registering mechanism is in subtract condition and the total keys are free to be depressed.

Upon depression of either the total or sub-total key the machine is automatically given a stroke of operation and the true negative total is printed.

When the negative total occurred and, when the "fugitive 1" was inserted, the yoke 212 (Fig. 1) was rocked clockwise and the bell crank lever 215 rocked counterclockwise to push the lock plate 124 forward far enough to release the total keys. This bell crank also pushes forward another slide plate 230 (Fig. 6) having a connection with an upwardly extending arm 231 of a slide 232 mounted on an arm 233 pivoted at 234. The slide 232 has an abutment 235 which is normally positioned over a stud 236 on a projection of the plate 25 supporting the add motor bar. In other words, normally, the parts are conditioned so that, upon depression of the total or sub-total key, the add motor bar plate 25 is depressed and the machine is caused to be given a stroke of operation in addition. But, when the bell crank 215 is rocked under the conditions above explained, the slide 230 is moved forward so that the abutment 235 comes over a stud 237 on the plate 60 supporting the subtract motor bar. This means that, when the total or sub-total key is depressed, the subtract motor bar plate 60 is moved downwardly and the machine is given a stroke of operation in subtraction. Since the machine has already been conditioned for subtraction it is not necessary to again condition it, but it will be observed that the depression of this subtract motor bar would cause it to be conditioned in subtraction if that were necessary. It is necessary to move the slide plate 232 to a position where it will depress the subtract motor bar rather than the add motor bar, as otherwise, the registers would be tumbled back to addition condition during the total taking operation and a wrong result would be obtained. It will be clear, however, that upon depression of the total or the subtotal key after a negative total has occurred and after the release key 140 has been depressed, a true negative total will be automatically taken without further manipulation of the machine on the part of the operator.

An interlock is provided between the total keys and slide 230 so that the total keys cannot be moved while the slide is moving from one position to another. For this purpose, the slide 230 is provided with lateral lugs 240 and 241 (Fig. 6) which move under the stems of the total keys as the slide is being moved from one position to another. These lugs are free of the total keys in either the add or subtract position of the slide, but in any intermediate position, prevent depression of the total keys.

It is to be understood that the construction shown is for purposes of illustration only and that variations may be made in it within the spirit and scope of the appended claims.

I claim:

1. A motor-driven machine of the class described having actuator racks, an addition-subtraction registering mechanism capable of accumulating positive or negative totals, means for conditioning the machine for either an addition or a subtraction type of engagement between said racks and registering mechanism, said registering mechanism being capable of yielding a true negative total during a total-taking operation with the machine conditioned for a subtraction type of engagement between said racks and registering mechanism, a total-taking means, locking means controlled by said registering mechanism automatically locking a manipulative member on said machine when said registering mechanism changes from positive to negative condition, a depressible release key having connections operable, upon depression of said key to condition said machine to cause it to be automatically given a single stroke of operation, and mechanism conditioned by depression of said release key and said single machine operation for conditioning said machine to take a true negative total.

2. A motor-driven machine of the class described having actuator racks, an addition-subtraction registering mechanism capable of accumulating positive or negative totals, means for conditioning said machine for either an addition or subtraction type of engagement between said racks and registering mechanism, said registering mechanism being capable of yielding a true negative total during a total-taking operation with the machine in condition for subtraction type of engagement between said racks and registering mechanism, a total-taking means, a negative total lock controlled by said registering mechanism automatically locking said total-taking means when said registering mechanism changes from positive to negative condition, a "fugitive 1" mechanism, a depressible release key, and mechanism operated by a single depression of said release key for causing a "fugitive 1" to be inserted in said registering mechanism, for releasing said locked total-taking means, and for causing said machine to automatically condition itself for a subtraction type of engagement between the racks and registering mechanism.

3. A motor-driven machine of the class described having actuator racks, an addition-subtraction registering mechanism capable of accumulating positive or negative totals, means for conditioning said machine for either an addition or subtraction type of engagement between said racks and registering mechanism, said registering mechanism being capable of yielding a true negative total during a total-taking operation with the machine conditioned for a subtraction type of engagement between the racks and registering mechanism, a total-taking means, a negative total lock controlled by said registering mechanism for automatically locking said total-taking means when said registering mechanism changes from positive to negative condition, a "fugitive 1" mechanism urged in a direction to insert a "fugitive 1" in said registering mechanism, and a depressible release key having connections operable, upon depression of said key, to release said "fugitive 1" mechanism, to release said total-taking means, and to condition said machine to cause it to go through a single stroke of operation to condition it for subtraction type of engagement between said racks and registering mechanism.

4. A motor-driven machine of the class described having actuator racks, an addition-subtraction registering mechanism capable of accumulating positive or negative totals, said registering mechanism being capable of yielding a true negative total, a total-taking means controlled by a total key, a negative total lock controlled by said registering mechanism automatically locking said total key when said registering mechanism changes from positive to negative condition, a depressible release key, mechanism conditioned by depression of said release key for releasing said total key and causing said machine to be given a single cycle of operation to condition it for taking a true negative total by a single cycle of machine operation, and means conditioned by depression of the released total key for causing the machine to automatically take a true negative total by a single cycle machine operation.

5. A machine of the class described having actuator racks, an addition-subtraction registering mechanism capable of accumulating positive and negative totals, means for conditioning said machine for either a subtraction or an addition type of engagement between said registering mechanism and racks, said registering mechanism being capable of yielding a true negative total when a subtraction type of engagement is used in total-taking operations, a total-taking means including a total key, a negative total lock for locking a member on said machine when the registering mechanism changes from positive to negative condition, a release key, mechanism conditioned by depression of said release key causing said machine to be given a single cycle of machine operation to condition it to take a true negative total, and means conditioned by the mechanism controlled by said release key for enabling a true negative total to be automatically taken by depression of said total key.

6. A motor-driven machine of the class described having actuator racks, a registering mechanism, an addition-subtraction registering mechanism capable of accumulating positive or negative totals, means for conditioning said machine for either an addition or a subtraction type of engagement between said racks and registering mechanism, a total-taking means including a total key, a negative total lock controlled by said registering mechanism for automatically locking a member on said machine when said registering mechanism changes from positive to negative condition, a "fugitive 1" mechanism, a depressible release key, means conditioned by said key acting to cause said "fugitive 1" mechanism to insert a "fugitive 1" in the registering mechanism and to release said locked member, said key conditioned means also acting to cause said machine to be automatically conditioned for a subtraction type of engagement between the actuator racks and registering mechanism, and means conditioned by said "fugitive 1" mechanism for enabling a true negative total to be automatically taken by depression of said total key.

7. A machine of the class described having an addition-subtraction registering mechanism capable of accumulating positive or negative totals, means for conditioning said machine for either an addition or a subtraction type of engagement between said racks and registering mechanism, a "fugitive 1" mechanism controlled by the manipulation of a manipulative member for inserting a "fugitive 1" in said registering mechanism in subtraction direction after the latter has changed from positive to negative condition, and means preventing a second "fugitive 1" being entered in said registering mechanism in subtraction direction as long as said registering mechanism remains negative and while said machine remains in condition for a subtraction type of engagement between the racks and registering mechanism.

8. A machine of the class described having actuator racks, an addition-subtraction registering mechanism capable of accumulating positive or negative totals, means for conditioning said machine for either an addition or a subtraction type of engagement between said racks and registering mechanism, a "fugitive 1" mechanism controlled by manipulation of a manipulative member for inserting a "fugitive 1" in said registering mechanism in subtraction direction after the latter has changed from positive to negative condition, and means preventing a second manipulation of said manipulative member as long as said registering mechanism remains in negative condition and said machine in condition for a subtraction type of engagement between said racks and registering mechanism.

9. A machine of the class described having actuator racks, an addition-subtraction registering mechanism capable of accumulating positive or negative totals, means for conditioning the machine to cause either a subtraction or an addition type of engagement between said registering mechanism and racks, a "fugitive 1" mechanism controlled by a manipulative member for inserting a "fugitive 1" in said registering mechanism after the latter is changed from positive to negative condition, and means controlled by said "fugitive 1" mechanism for preventing a second "fugitive 1" from being inserted in subtraction direction as long as said registering mechanism remains in negative condition and said machine in condition for a subtraction type of engagement between said registering mechanism and racks.

10. A machine of the class described having actuator racks, an addition-subtraction registering mechanism capable of accumulating positive or negative totals, means for conditioning the machine for either an addition or a subtraction type of engagement between said registering mechanism and racks, a "fugitive 1" mechanism automatically conditioned to insert a "fugitive 1" in addition direction in said registering mechanism each time the machine is operated while in condition for an addition type of engagement between the racks and registering mechanism, and means for preventing said "fugitive 1" mechanism from operating unless a "fugitive 1" has previously been inserted in said registering mechanism in subtraction direction.

11. A machine of the class described having actuator racks, an addition-subtraction registering mechanism capable of accumulating positive or negative totals, means for conditioning the machine for either an addition or subtraction type of engagement between said registering mechanism and racks, a "fugitive 1" mechanism urged in a direction to insert a "fugitive 1" in the registering mechanism, a restraining latch for said "fugitive 1" mechanism released during each operation of the machine when conditioned for an addition type of engagement between the racks and registering mechanism, and a second restraining latch for said "fugitive 1" mechanism for preventing operation of the latter unless a "fugitive 1" has been inserted in the registering mechanism in subtraction direction prior to the addition operation of the machine.

12. A machine of the class described having actuator racks, an addition-subtraction registering mechanism capable of accumulating positive or negative totals, means for conditioning the machine for either an addition or a subtraction type of engagement between the racks and registering mechanism, a "fugitive 1" mechanism urged in a direction to insert a "fugitive 1" in said mechanism, a restraining latch for said "fugitive 1" mechanism released during each addition operation of the machine, a second restraining latch for said "fugitive 1" mechanism, and means controlling said second latch to release it only when an addition operation is performed after a negative total has occurred and a "fugitive 1" has been inserted in subtraction direction.

13. A machine of the class described having actuator racks, an addition-subtraction registering mechanism capable of accumulating positive or negative totals, means for conditioning the machine for either an addition or a subtraction type of engagement between said racks and registering mechanism, a "fugitive 1" mechanism controlled by a manipulative member for inserting a "fugitive 1" in said registering mechanism in subtraction direction after the latter has changed from positive to negative condition, and means acting automatically to insert a "fugitive 1" in said registering mechanism in addition direction during an addition operation of the machine after a negative total has occurred and a "fugitive 1" has been inserted in subtraction direction.

14. A machine of the class described having actuator racks, an addition-subtraction registering mechanism movable from addition to subtraction position and capable of accumulating positive or negative totals, a "fugitive 1" mechanism controlled by a manipulative member for inserting a "fugitive 1" in said registering mechanism in subtraction direction after the latter has changed from positive to negative condition, and means controlled by the addition-subtraction position of said registering mechanism for automatically inserting a "fugitive 1" in said registering mechanism in addition direction when the machine is operated to perform addition after a negative total has occurred and a "fugitive 1" has been inserted in subtraction direction.

15. A machine of the class described having actuator racks, an addition-subtraction registering mechanism capable of accumulating positive or negative totals, means for conditioning the machine for either an addition or a subtraction type of engagement between said racks and registering mechanism, a "fugitive 1" mechanism urged in a direction to insert a "fugitive 1" in said registering mechanism, a restraining latch for said "fugitive 1" mechanism releasable by a manipulative member to insert a "fugitive 1" in said registering mechanism in subtraction direction after the registering mechanism has changed from positive to negative condition, and means acting automatically to release said latch by an addition operation of said machine after a "fugitive 1" has been inserted in said registering mechanism in subtraction direction to thereby enable said "fugitive 1" mechanism to insert a "fugitive 1" in addition direction.

16. A machine of the class described having actuator racks, an addition-subtraction registering mechanism capable of accumulating positive or negative totals, means for conditioning the machine for either an addition or a subtraction type of engagement between said racks and registering mechanism, a "fugitive 1" mechanism urged in a direction to insert a "fugitive 1" in said registering mechanism, a restraining latch for said "fugitive 1" mechanism, a manipulative member for releasing said latch to cause a "fugitive 1" to be inserted in subtraction direction in said registering mechanism after it has changed from positive to negative condition, means operated automatically during each addition operation of the machine for releasing said latch for inserting a "fugitive 1" in addition direction, a second restraining latch for said "fugitive 1" mechanism, and means controlling said second latch to prevent it releasing said "fugitive 1" mechanism except upon the first manipulation of said manipulative member after said registering mechanism has changed from positive to negative condition and except upon the first addition operation of the machine after the registering mechanism is changed to negative condition and after said manipulative member has been manipulated.

17. A machine of the class described having a registering mechanism capable of accumulating positive or negative totals, a negative total lock controlled by said registering mechanism for locking a manipulative member of the machine when said registering mechanism goes from positive to negative condition, a "fugitive 1" mechanism, a release key for causing said "fugitive 1" mechanism to insert a "fugitive 1" in said registering mechanism after the latter has changed from positive to negative condition, and means controlled by said "fugitive 1" mechanism for releasing said manipulative member and locking said release key when a "fugitive 1" is inserted in said registering mechanism.

18. A machine of the class described having a registering mechanism comprising a plurality of pinions capable of accumulating positive or negative totals, a negative total lock controlled by the pinion of highest order of said registering mechanism for locking a manipulative member on said machine when the registering mechanism changes from positive to negative condition, a "fugitive 1" mechanism operable by a release key for inserting a "fugitive 1" in said registering mechanism after the latter has changed from positive to negative condition, and means controlled by "fugitive 1" mechanism during its movement to insert a "fugitive 1" for releasing said manipulative member and locking said release key.

19. A machine of the class described having means for conditioning the machine for subtraction, a registering mechanism capable of accumulating positive or negative totals, a manipulative member for conditioning the machine for a certain operation, locking means for said manipulative member moved to locked position each time said conditioning means conditions said machine for subtraction and returned to released position after each subtraction operation, and means controlled by said registering mechanism for holding said locking means in locked position when said registering mechanism changes from positive to negative condition.

20. A machine of the class described having a subtract motor bar depressible to condition the machine for subtraction, a registering mechanism capable of accumulating positive or negative totals, a total-taking means for conditioning the machine for taking a total, a locking plate for said total-taking means urged out of locking position but moved to locking position by said subtract bar as the latter is depressed, and a negative total lock controlled by said registering mechanism for holding said locking bar in locked position when said registering mechanism changes from positive to negative condition.

21. A machine of the class described having a manipulative member for conditioning the machine for a certain operation, a registering mechanism capable of accumulating positive or negative totals, means controlled by said registering mechanism for automatically locking said manipulative member when said registering mechanism changes from positive to negative condition, mechanism for inserting a "fugitive 1" in said registering mechanism after it has changed to negative condition, and means acting to automatically release said locked manipulative member as an incident to the insertion of a "fugitive 1" in the registering mechanism.

22. A machine of the class described having a total-taking means, a registering mechanism capable of accumulating positive or negative totals, a negative total lock controlled by said registering mechanism for locking said total-taking means against depression when said registering mechanism changes from positive to negative condition, mechanism for inserting a "fugitive 1" in said registering mechanism, and means controlled by said "fugitive 1" mechanism for releasing said negative total lock at the time the "fugitive 1" is inserted in said registering mechanism.

23. A machine of the class described having a depressible total key, a registering mechanism capable of accumulating negative or positive totals, a negative total lock controlled by said registering mechanism, said negative total lock including a plate movable in a given direction to lock said total key when said registering mechanism changes from positive to negative condition, mechanism for inserting a "fugitive 1" in said registering mechanism, and means controlled by said "fugitive 1" mechanism for moving said plate in said given direction to unlock said total key.

24. A machine of the class described having a manipulative member for conditioning the machine for a certain operation, a registering mechanism movable from addition to subtraction condition and vice versa, said registering mechanism being capable of accumulating positive or negative totals, means controlled by said registering mechanism for automatically locking said manipulative member when said registering mechanism changes from positive to negative condition, a "fugitive 1" mechanism for inserting a "fugitive 1" in said registering mechanism, and means controlled by the addition-subtraction condition of said registering mechanism and by said "fugitive 1" mechanism for automatically releasing said locked manipulative member when a "fugitive 1" is inserted with said registering mechanism in subtraction condition.

THOMAS M. BUTLER.